Dec. 29, 1964  J. HINTZE ETAL  3,162,951
STATIONARY GYROSCOPIC COMPASS
Filed March 23, 1960  4 Sheets-Sheet 1

INVENTORS
Johannes Hintze
and Hans Ehrich
By:
Attorney

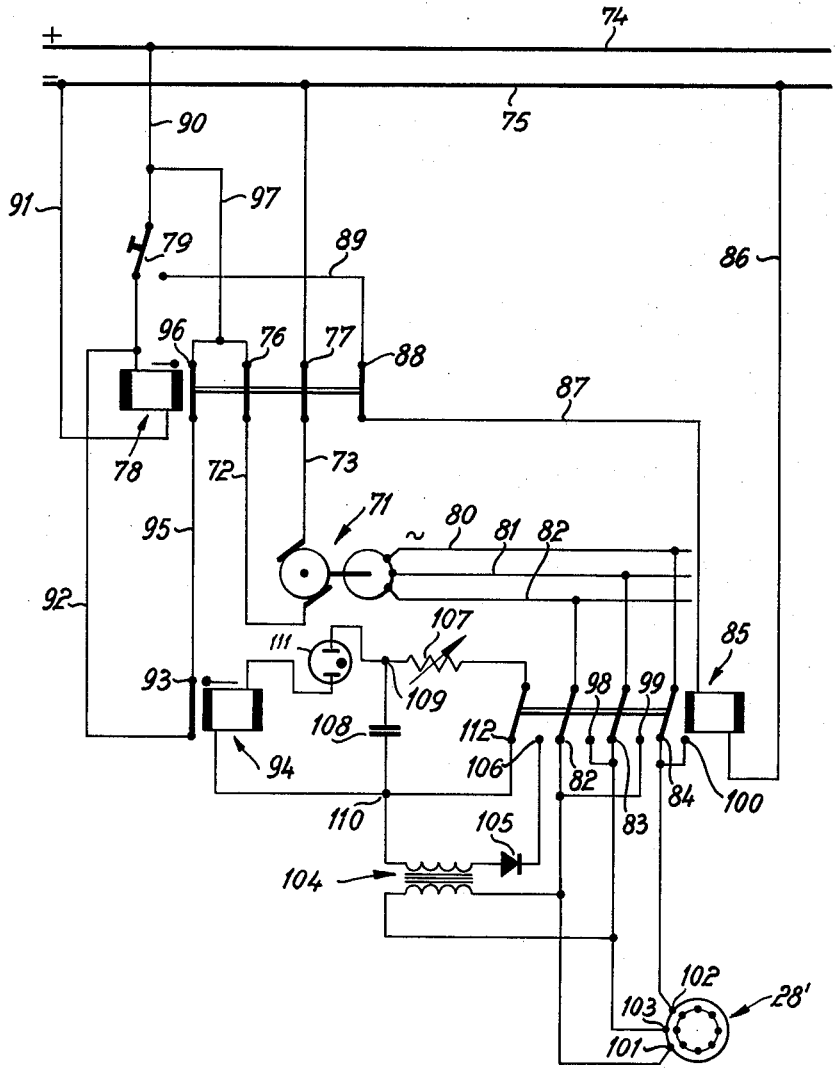

United States Patent Office 3,162,951
Patented Dec. 29, 1964

3,162,951
STATIONARY GYROSCOPIC COMPASS
Johannes Hintze, Kiel, and Hans Ehrich, Kiel-Schulensee, Germany, assignors to Anschutz & Co., G.m.b.H., Kiel-Wik, Germany, a German company
Filed Mar. 23, 1960, Ser. No. 17,094
Claims priority, application Germany, Mar. 31, 1959, A 31,716
11 Claims. (Cl. 33—72)

Our invention relates to a stationary gyroscopic compass serving the purpose of turning a theodolite into registry with the meridian for geodetic purposes.

It is the object of our invention to provide an improved gyroscopic compass of this kind which aligns the theodolite with the meridian with great accuracy and constancy of any possible deviation and which, after having been put in operation at any particular location, will come to rest within a minimum of time of the order of ten minutes or less.

Further objects of our invention are to provide a compass of the kind described which is of rugged structure and not liable to be damaged in transportation from one place to another and requires a minimum of maintenance but is reliable and accurate in operation and of compact design and has a long life.

Finally, it is an object of our invention to provide an improved stationary gyroscopic compass equipped with control means for stopping the electric motor preparatory to transport of the compass to another location.

Further objects of our invention will appear from a detailed description of a preferred embodiment of our invention following hereinafter with reference to the accompanying drawings. It is to be understood, however, that our invention is not limited to such details but is capable of numerous modifications within the scope of the appended claims and that the terms and phrases used in such detailed description have been chosen for the purpose of explaining rather than that of restricting or limiting our invention.

Figure 1:
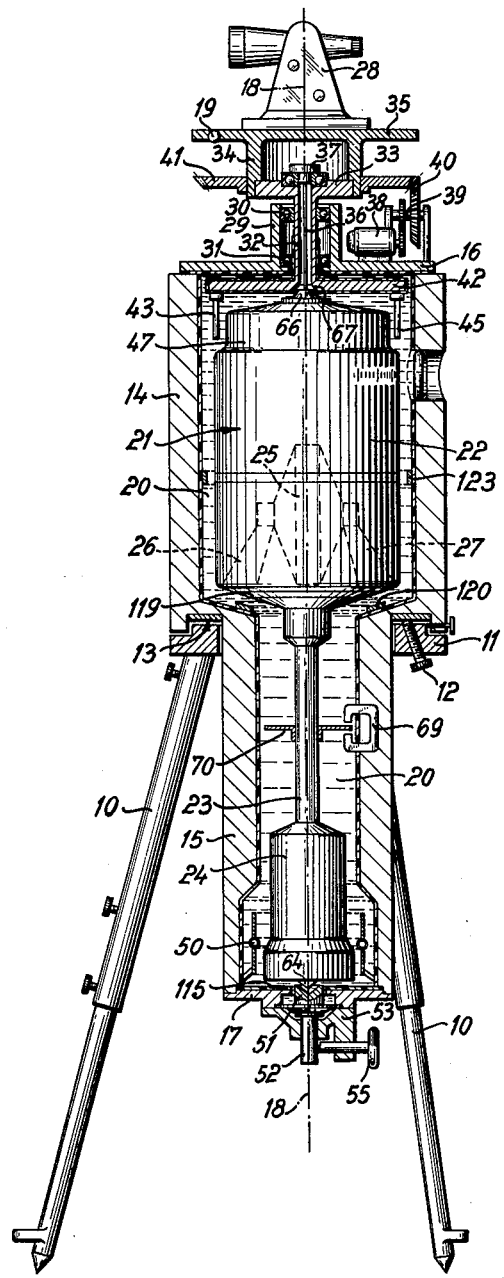
Figure 2:
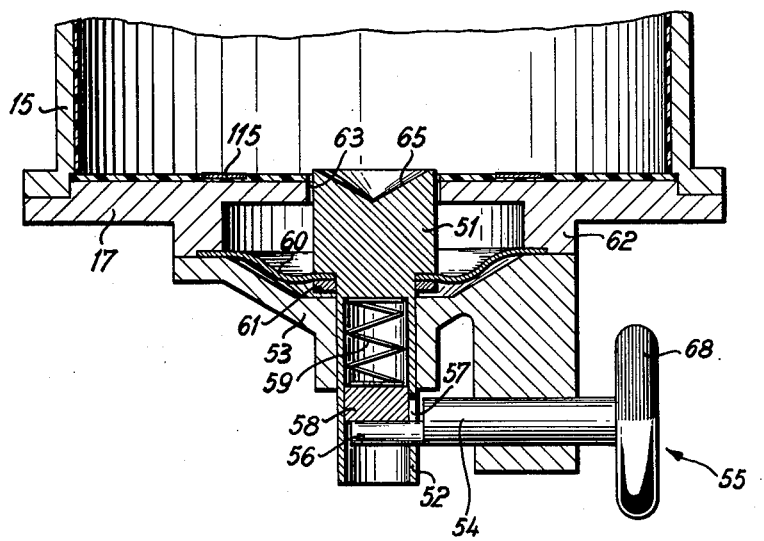
Figure 3:
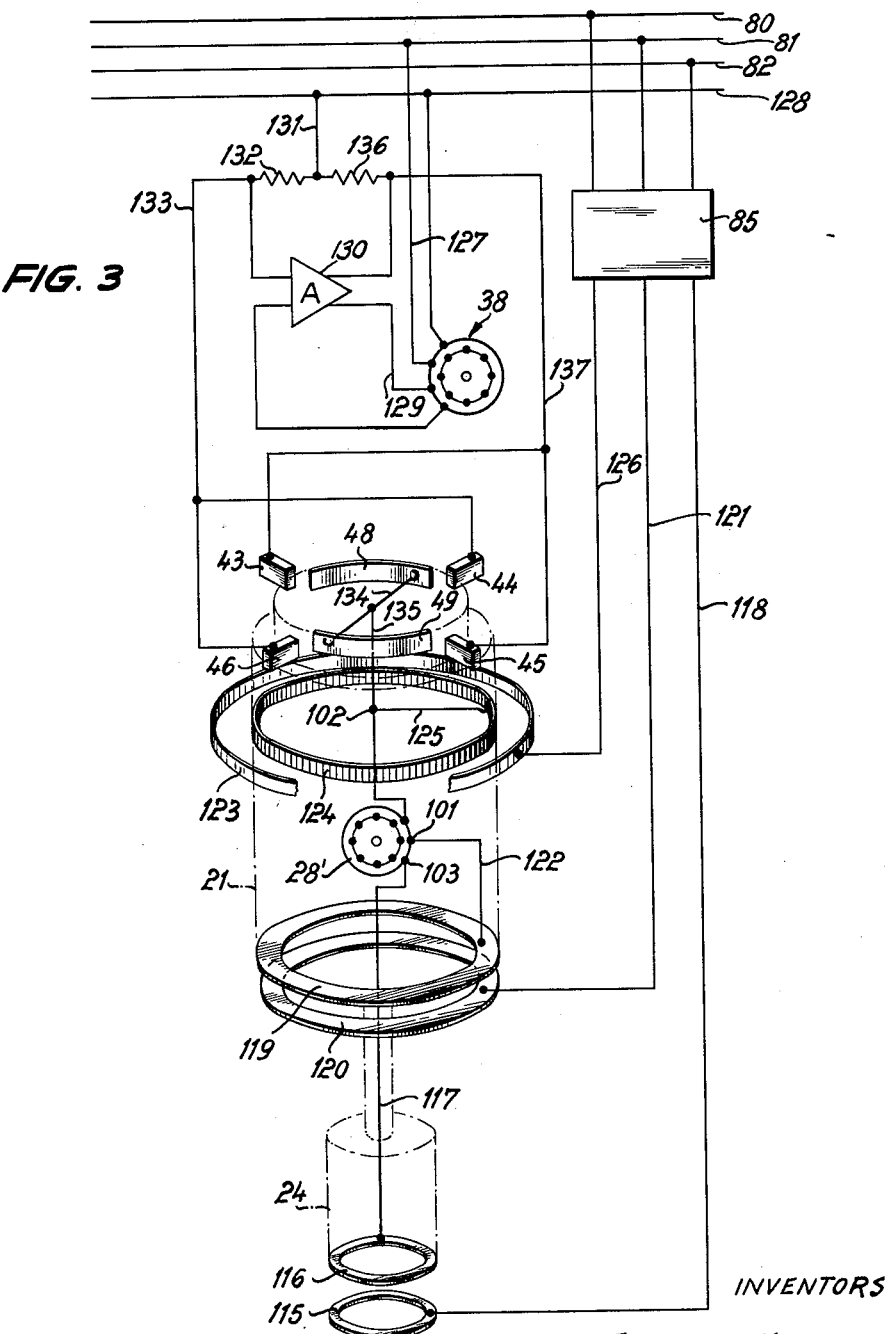

In the accompanying drawings in which a preferred embodiment of our invention is illustrated FIG. 1 is a vertical longitudinal section of our stationary gyroscopic compass, the float thereof being shown in elevation, FIG. 2 is a sectional view of the lower part of the housing similar to FIG. 1 but on an enlarged scale, FIG. 3 is an electrical circuit diagram including an isometric view of the electrodes shown in FIG. 1, and FIG. 4 is an electrical circuit diagram illustrating control means for stopping rotation of the gyroscope.

A tripod, preferably of the type having extensible legs 10 of the telescope type, is provided with an annular top 11 provided with three circumferentially distributed threaded bores, each bore accommodating an adjusting screw 12 projecting above the top face of the annular member 11 to engage a downwardly facing shoulder 13 of a container which comprises an upper cylindrical portion 14 of larger diameter, a lower cylindrical portion 15 of smaller diameter with the shoulder 13 at the juncture of portions 14 and 15, a top cover 16 and a bottom cover 17. By means of the adjusting screws 12, the container can be easily so adjusted that its vertical axis 18 extends exactly in vertical direction. For the purpose of facilitating such adjustment, the compass is provided with a level 19.

The container is filled with a liquid 20 and encloses a float 21 therein. Preferably, the liquid is electrically conductive and may be formed by acidified water.

The container 14, 15, 16 and 17 and the float 21 have a shape affording them freedom for relative rotation about the vertical axis 18. In the embodiment illustrated, both the internal walls of the housing sections 14 and 15 and the external walls of the float 21 are surfaces of revolution coaxially disposed with respect to the axis 18.

The float comprises an upper substantially cylindrical housing 22 and a weight mounted on the bottom of housing 22 and comprising a stem 23 extending downwardly from the bottom of the housing 22 and a head 24 fixed to the stem 23 and extending into close vicinity of the bottom cover 17.

A gyroscope diagrammatically indicated at 25 is carried by the float 21 with its axis of rotation in horizontal position. More particularly, standards 26 and 27 are mounted on the bottom of housing 21 and carry coaxial bearings having a horizontal axis and mounting the shaft of the rotor of the gyroscope, the rotor including an electric motor 28' (FIGS. 3 and 4) of the three-phase type. As gyroscopes of this kind are well known in the art, a detailed description thereof is deemed dispensable herewith.

The float 21 and all of the elements carried thereby including the gyroscope 25 are so designed that its center of gravity is located a substantial distance below the center of buoyancy of the float 21. The weight 24 serves to increase such distance.

A theodolite 28 is mounted on the container 14, 15, 16 and 17 for rotation about the vertical axis 18. More particularly, the top cover 16 is formed with a sleeve 29 disposed coaxially to the axis 18 and surrounding a pair of antifriction bearings 30 and 31 in which a hollow shaft 32 is journaled. The hollow shaft 32 has an upper horizontal flange 33 which is embraced by and fixed to the cylindrical depending flange 34 of a circular table 35. The theodolite 28 rests on and is fixed to the table 35. The elements 32, 33, 34, 35 and 28 are thus mounted for common rotation, although they may be relatively rotatably adjustable about the axis 18, if desired.

Suitable means are mounted on one or both of the elements formed by the container and the float 21 for exerting a force on the float 21 to maintain same in floating condition. Such means are well known in the art. They may comprise a coil mounted on the head 24 in coaxial relationship to the axis 18 and energized by alternating current for the purpose of inducing eddy currents in the bottom cover 17 made of a conductive material, such eddy currents exerting a repelling force upon the coil, thus keeping the same spaced from the cover 17. As the provision of such a coil is well known in gyroscopic compasses (see British Patent 682,908, coil 20), an illustration thereof is deemed dispensable herewith. Preferably, however, the means exerting a force on said float maintaining it in floating condition is formed by a flexible traction member, such as a metal strip 36 having its upper end mounted in fixed relationship to the theodolite 28 and having its lower end fixed to the float 21 and extending along the vertical axis 18. The weight of the float 21 and the elements carried thereby exceeds the buoyancy of the float and, therefore, will keep the metal strip 36 taut. More particularly, the strip 36 extends from the center of the top of the float 21 through the hollow shaft 32 and its upper end is fixed to a circular member 37 which is rotatably supported by an antifriction bearing and is adjustably fixed to the flange 33.

A follow-up motor 38 is provided for producing relative rotation of the container and the theodolite about the vertical axis 18. In the embodiment shown, electric motor 38 is a reversible two-phase alternating current motor mounted on the top cover 16 of the container. Its shaft is geared to a lay shaft 39 by a pair of meshing spur gears and a bevel pinion 40 fixed to the lay shaft 39 meshes with a bevel gear 41 fixed to the flange 34. Hence, rotation of motor 38 will cause rotation of the theodolite 28 relative to the container 14, 15, 16 and 17 about the axis 18.

Sensing means are provided for sensing the relative angular position of the theodolite 28 and the float 21. In the embodiment shown, this sensing means comprises a flange 42 and four circumferentially distributed electrodes 43, 44, 45 and 46 carried thereby in closely spaced relationship to the upper peripheral cylindrical surface 47 of the housing 22. The flange 42 is fixed to the lower end of shaft 32 which extends downwardly through a central opening of the top cover 16 into the interior space of the container filled by the liquid. The electrodes 43–46 cooperate in a manner to be described later with a pair of electrodes 48 and 49 provided on the cylindrical surface 47. Suitable control means to be described hereinafter are connected to the electrodes 43–46 and to the reversible follow-up motor 38 for causing the latter to impart follow-up rotation to the theodolite 28 relative to the float 21.

Suitable damping means are provided to dampen rotary oscillations about the vertical axis 18. As such damping means are well known in the art, a detailed description thereof is deemed dispensable herewith. In FIG. 1 such damping means are illustrated as an eddy current brake comprising a permanent horse-shoe magnet 69 so mounted on portion 15 of the container as to project into the interior space thereof and a disk 70 of magnetizeable material fixed to the shaft 23 and extending between the poles of the magnet 69. Relative rotation of the float 21 and the container will cause the permanent magnet 69 to induce eddy currents in disk 70 which will produce a braking couple which decreases to zero as the rotary speed of the float 21 relative to the container drops to zero.

A thermostat-controlled annular heating element 50 is disposed within the liquid surrounding the head 24 and serves the purpose of maintaining the temperature of the liquid as constant as possible.

As it is desirable to lock the float 21 in fixed relationship to the container 14, 15, 16 and 17 during transportation in order to preclude erratic movements of the float liable to damage it, we have provided arresting means mounted on the container for engagement with the float causing same to be locked in coaxial relationship to the container, and manually operable means for optionally rendering said arresting means effective and ineffective. In the embodiment shown, the arresting means comprises a plunger 51 having a depending coaxial hollow stem 52 slidably guided within a central vertical bore of a bracket 53 which is fixed to the bottom cover 17 and has a horizontal bore accommodating a shaft 54 of a knob 55. An eccentric pin 56 projecting from the inner end of stem 54 extends through a lateral aperture 57 of the hollow stem 52 below a piston 58 which is slidably guided within the stem 52. A helical pressure spring 59 is inserted in the hollow stem 52 between the piston 58 and the plunger 51. A diaphragm 60 clamped to the bottom shoulder of the plunger 51 by an annular nut 61 has its peripheral marginal portion tightly clamped between the bracket 53 and a cylindrical flange 62 of the bottom cover 17. The latter is provided with a central opening 63, through which plunger 51 projects into close vicinity of the head 24 of the float 21. Preferably, a central conical projection 64 is provided on the bottom face of the head 24 in opposed relationship to a conical depression 65 provided on the top face of the plunger 51.

The top face of the housing 22 is provided with a conical projection 66 in opposed relationship to but normally spaced from a conical depression 67 provided in the bottom of flange 42 coaxially to axis 18.

For the purpose of transporting the gyroscopic compass, the knob 55 is turned from the position shown in FIG. 2 by 180° causing the eccentric pin 56 to lift the piston 58 and to bias spring 59 which will raise plunger 51 into contact with the float 21 raising the latter and causing the projection 66 to engage the depression 67. As a result, engagement of the conical projections 64 and 66 with the conical depressions 65 and 67 will lock the float 21 within the container in coaxial relationship to the axis 18 thereof.

Preferably, suitable indicating means are associated with the manually operable means 55 for indicating the effective condition and the ineffective condition of the arresting means 51. In the embodiment shown such indicating means are formed by a coat 68 of red paint covering half of the knob 55 and facing upwardly, when the parts assume the position illustrated in FIG. 2 in which the float is in floating condition and, therefore, is in too sensitive a condition to withstand transportation.

The operation of our improved gyroscopic compass is as follows: After the tripod 10, 13 has been erected and the container 14, 15, 16, and 17 has been inserted therein, the adjusting screws 12 are so adjusted as to bring axis 18 in accurately vertical position. Then the knob 53 is so turned that its red coat 68 faces upwardly. Thereafter, the gyroscopic compass is electrically hooked up to a motor-generator 71 causing the gyroscope to spin, FIG. 4. As a result, the rotation of earth will cause the gyroscope 25 to swing its axis of rotation about the axis 18 towards the meridian, thus producing an oscillation of the float 21 about axis 18, such oscillation being damped by the damping means 69 and 70. After about ten minutes, the float 21 will have come to rest. During these oscillations the electrodes 43–46 and the elements 28, 32, 33, 34, 35 and 42 connected therewith for common rotation are so driven by the follow-up motor 38 as to maintain the theodolite 28 in an invariable angular position relative to the float 21. Therefore, after the float 21 will have come to rest, the theodolite will be in accurate alignment with the meridian having been so adjusted fully automatically.

The weight of the float will exceed the buoyancy thereof by a very small force only. As a result, the antifriction bearings 30 and 31 have to carry a very slight thrust only and will, therefore, offer no substantial frictional resistance to the follow-up motor 38. Owing to the large distance of the center of gravity of the float from its center of buoyancy, the period of oscillation of the float about axis 18 under the effect of the rotation of the earth will be very short amounting to a few minutes only.

The disposition of the gyroscope 25 in the upper portion 22 of the float 21 offers the advantage that the heat produced by the electric driving motor of the gyroscope and transferred to the liquid 20 will produce a minimum of convection currents only because of the relatively short distance between the source of heat and the top of the container.

It is desirable that the gyroscopic compass will be ready for transportation right after the geodetic measurements to be carried out with the theodolite 28 will have been completed. It is necessary, however, to postpone transportation until the gyroscope will have stopped its rotation substantially because otherwise the axle of the gyroscope would exert excessive precessional forces on its bearings which might be detrimental. Therefore, we have provided control means for reversing the torque produced by the driving motor 28' of the gyroscope. Reversal of this torque results in a quick stoppage of the gyroscope which, in the absence of such control means, would continue to run with high speed for a considerable period of time because of the small magnitude of the friction in relation to the momentum of the gyroscope.

The control means for reversing the torque of motor 28' are illustrated in FIG. 4. The input terminals 72 and 73 of the motor generator 71 may be connected to the terminals 74 and 75 of a source of direct current through the intermediary of normally open contacts 76 and 77 cooperating with armatures of a relay whose winding 78 may be connected in circuit with the source of current 74, 75 by a switch 79 when the same is in its left-hand position illustrated in FIG. 4.

The output terminals 80, 81 and 82 of the motor generator 71 supply a three-phase alternating current to the electric motor 28' of the gyroscope through the intermediary of normally closed contacts 82, 83 and 84 respectively, cooperating with armatures of a relay whose winding 85 is included in a circuit comprising terminal 75 of the source of direct current, lead 86, winding 85, lead 87, normally open contact 88 of relay 78, conductor 89, right-hand contact of switch 79, lead 90 and terminal 74. In FIG. 4 this circuit is shown in a condition in which it is interrupted by switch 79. Therefore, the normally closed contacts 82, 83 and 84 connect the electric motor 28' to the terminals 80, 81 and 82 for forward rotation.

For the purpose of stopping the rotation of the gyroscope, switch 79 is shifted to its right-hand position. This does not cause deenergization of the winding of relay 78 because the latter remains included in a circuit comprising terminal 75 of the source of direct current, lead 91, winding of relay 78, lead 92, normally closed contact 93 of a relay 94, lead 95, normally open contact 96 (now closed) of relay 78, lead 97, lead 90 and terminal 74. Therefore, contacts 76, 77, 88 and 96 remain closed, until the holding circuit will be opened by energization of relay 94. The winding of relay 85, however, will be energized owing to the shifting of switch 79 to its right-hand position. Therefore, the terminals 80, 81 and 82 will be connected with the normally open contacts 98, 99 and 100 of relay 85. Whereas terminal 102 of motor 28 will remain connected with terminal 80, the connection of terminal 103 will be shifted from terminal 81 to terminal 82 and the connection of terminal 101 will be shifted from terminal 82 to terminal 81 of the motor generator. As a result, the torque produced by the electric motor 28' will be reversed. A time switch is provided which will energize relay 94 to disconnect the motor generator 71 from the source of direct current 74, 75 after a certain period of time has elapsed since the energization of relay 85. In the embodiment shown, a transformer 104 has its input terminals connected to terminals 101 and 103 and has its output connected in circuit with a rectifier 105, a normally open contact 106 of relay 85, an adjustable resistor 107 and a capacitor 108. Energization of relay 85 will close the normally open contact 106, thus causing the capacitor 108 to be charged through the resistor 107 causing the voltage across its terminals 109 and 110 to be gradually raised at a slow speed. As soon as this voltage has been raised to a level sufficient to render a gas-filled tube 111 conductive, relay 94 placed in circuit with terminals 109 and 110 and tube 111 will be energized, thereby opening contact 93, thus interrupting the holding circuit for relay 78 which will be deenergized and will open its contacts 96, 76, 77 and 88, thereby disconnecting the motor generator 71 from the source of current 74, 75. This happens when the braking torque produced by motor 28' will have slowed down the gyroscope 25 substantially to stoppage. Deenergization of relay 78 causes the contact 88 to be opened, thereby deenergizing relay 85. As a result, contact 112 will be closed, thus shortcircuiting and discharging the capacitor 108.

In FIG. 3 we have shown a circuit diagram showing the means for supplying the electric current through the liquid 20 to the electric motor 28' and the control means connected to the sensing means 43-49 and to the follow-up motor 38 for causing the latter to impart follow-up rotation to the theodolite 28 relative to the float 21.

The internal surface of the container 14, 15, 16 and 17 and the external surfaces of the lower end of the hollow shaft 32, of the flange 42 and of the float 21 are coated with an electrical insulating material. This coat, however, does not cover the electrodes 43 to 46, 48 and 49 described hereinabove. While we have illustrated terminals 101, 102 and 103 in FIG. 4 as being directly connected to the contacts of relay 85, such connections include pairs of electrodes shown in FIGS. 1 and 3. One pair of electrodes comprises a flat annular conductve strip 115 mounted on the inner face of the bottom cover 17 coaxially to axis 18 and an opposed flat annular strip 116 mounted on the bottom face of head 24, both strips 115 and 116 being mounted in contact with the liquid 20. The strip 116 is connected by a conductor 117 to motor terminal 103, whereas the strip 115 is connected by a conductor 118 to contacts 83 and 98 of relay 85 as shown in FIG. 4. A second pair of electrodes comprises a flat annular strip 119 fixed to the bottom of container 22 and an opposed flat annular strip 120 fixed to the internal shoulder provided between the container sections 14 and 15. Strip 120 is connected by a lead 121 to terminals 82 and 99 of relay 85, whereas strip 119 is connected by a lead 122 to terminal 101 of motor 28. The third pair of opposed electrodes comprises a cylindrical conductive strip 123 fixed to the interior peripheral face of portion 14 of the container between the ends thereof and a cylindrical conductive strip 124 fixed in opposed relationship to the strip 123 to the external peripheral face of the housing 22. The strip 124 is connected by a lead 125 to terminal 102 of the electric motor 28, while the strip 123 is connected by a lead 126 to the terminals 84 and 100 of the relay 85.

It will be noted from FIG. 1 that the three pairs of annular strips are spaced a considerable axial distance from each other owing to the great axial length of the float. As a result, the currents flowing axially between the strips 115, 120 and 123 are reduced to a minimum as is desirable in order to reduce the heating effect of the current on the liquid as much as possible.

The follow-up motor 38 is a reversible two-phase alternating current motor having a phase winding 127 permanently connected between terminal 81 of the motor generator set 72 and a terminal 128 thereof which is grounded. Therefore, phase winding 127 will be energized with alternating current of an invariable phase. The other phase winding 129 of the follow-up motor 38, however, is energized with an alternating current of the same frequency of preferably 333 cycles per second which may be shifted through 180° so as to either lag behind the phase of the current through winding 127 or to precede it. For that purpose, the winding 129 is connected to the output of an amplifier 130 whose input constitutes the diagonal of a bridge circuit connected between motor terminal 102 and zero terminal 128. One branch of this bridge circuit comprises a lead 131, a resistor 132, a lead 133, the electrodes 44, 46, a conductive path constituted by the liquid 20, electrodes 48 and 49 and leads 134 and 135. The other branch of the bridge circuit comprises a resistor 136, a lead 137, the electrodes 43 and 45, a conductive path constituted by the liquid 20, the electrodes 48 and 49, the leads 134 and 135 and the terminal 102. The input of the amplifier 130 is connected to the leads 133 and 137. The follow-up motor 38 has the tendency of maintaining the theodolite in such an angular relationship to the float 21 that the electrode 48 is equally spaced from the electrodes 43 and 44 and that the electrode 49 is equally spaced from the electrodes 45 and 46. As a result, equal resistances are put in series with the leads 133 and 137 causing equal potentials to be applied to the input terminals of the amplifier 130. As a result, the output voltage of the amplifier 30 is zero and the follow-up motor rests. Rotation of the float relative to the theodolite 28 mounted for common rotation with the electrodes 43-46 in clockwise direction reduces the resistance in series with conductor 133 and, at the same time, increases the resistance in series with the conductor 137. As a result, a voltage is produced at the output terminals of the amplifier 130 causing the follow-up motor to rotate in such a direction as to turn the theodolite and the electrodes 43 to 46 connected therewith likewise in clockwise direction until the output voltage of amplifier 130 disappears. A voltage of the opposite polarity, however, will be produced at the output of the amplifier 130, when the float 21 turns in anticlockwise direction with reference to the theodolite. As a result, the follow up motor will keep the set of electrodes 43–46 very accurately within the relative position to the float 21 which is illustrated in FIG. 3.

A feature of particular importance is the interposition of the pressure spring 59 between the arresting means 51 and the manually operable means 54, 55, 56 for optionally rendering the arresting means effective and ineffective, because the spring 59 limits the force exerted by the plunger 51 upon the float, thereby preventing damage thereto.

The embodiment described hereinabove with reference to the illustrations is capable of numerous modifications. Thus, we may reduce the axial distance between the bearings carrying the gyroscope 25 and the set of electrodes 43–46 to a minimum in order to reduce a relative angular displacement thereof about axis 18 owing to torsional strains of the container 22. While the sensing means for sensing the angular position of the theodolite relative to the float with respect to the vertical axis 18 are formed by electrodes functioning in an electrolytic manner, any other sensing means will known in the art may be substituted, such as inductive sensing means or capacitively operating sensing means.

Also the damping means 69, 70 may be replaced by any other means capable of dampening the oscillations of the float 21 about the axis 18.

From the foregoing it will be seen that this invention is one well adapted to attain all of the ends and objects hereinabove set forth, together with other advantages which are obvious and which are inherent to the apparatus.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention and the limits of the appended claims.

What we claim is:

1. Stationary gyroscopic compass comprising a container, a liquid filling said container, a float in said liquid, means mounted on at least one of the elements formed by said container and said float for exerting a force on said float maintaining the floating condition thereof, a gyroscope carried by said float with its axis of rotation in horizontal position, said container and said float having a shape affording freedom for relative rotation about a verical axis and the center of gravity of said float and the elements carried thereby including said gyroscope being located a substantial distance below the center of buoyancy of said float, a theodolite mounted on said container for rotation about said vertical axis, sensing means connected with said theodolite for sensing the angular position of said theodolite relative to said float with respect to said vertical axis, said first-named means including a flexible elongated vertical suspension member disposed above said float and having its lower end fixed to said float and its upper end to said theodolite, a follow-up motor connected with said container and to said theodolite for producing relative rotation thereof about said vertical axis, control means connected to said sensing means and to said motor for causing the latter to impart follow-up rotation to said theodolite relative to said float keeping said suspension member in relaxed condition, and damping means on said float to dampen rotary oscillations thereof about said vertical axis, the spin of said gyroscope being so correlated to the weight of said float and of the elements carried thereby, to said buoyancy, to said distance and to the damping force exerted by said damping means as to result in a period of said oscillations amounting to a few minutes and in a reduction of the amplitude of said oscillations to substantially zero within a period of the order of ten minutes.

2. The combination claimed in claim 1 in which said float is formed by a housing, said combination further comprising means within said housing for mounting said gyroscope for rotation about a horizontal axis and a weight mounted on the bottom of said housing.

3. The combination claimed in claim 2 in which said weight extends downwardly from the bottom of said housing.

4. The combination claimed in claim 1 in which said theodolite is disposed above said float, and said means mounted on said container for exerting a force on said float is formed by a flexible traction member having its upper end mounted in fixed relationship to said theodolite and having its lower end fixed to said float and extending along said vertical axis, the weight of said float exceeding the buoyancy thereof.

5. The combination claimed in claim 1 in which said sensing means includes at least one electrode fixed to said float in contact with said liquid and at least one other electrode mounted in fixed relationship to said theodolite in contact with said liquid in opposed relationship to said first-mentioned electrode, and a source of alternating current connected to said electrodes.

6. The combination claimed in claim 1 further comprising an electric motor connected to said gyroscope for driving same, pairs of opposed electrodes each pair comprising one electrode mounted on said float in contact with said liquid and another electrode mounted on said container in contact with said liquid, a source of current, and circuit means including said pairs of opposed electrodes and connected to said source of current and to said electric motor for supplying electric power thereto.

7. The combination claimed in claim 1 further comprising an electric motor connected with said gyroscope for producing a torque driving the latter, a source of current, circuit means connecting said source of current with said electric motor for supplying electric power thereto, and control means associated with said circuit means for reversing said torque for the purpose of stopping rotation of said gyroscope.

8. The combination claimed in claim 7 further comprising a time switch connected to said control means for disabling the same upon expiration of a predetermined time following operation of said control means.

9. The combination claimed in claim 1 further comprising arresting means mounted on said container for engagement with the float causing same to be locked in coaxial relationship to said container, and manually operable means for optionally rendering said arresting means effective and ineffective.

10. The combination claimed in claim 9 further comprising indicating means associated with said manually operable means for indicating the effective condition and the ineffective condition of said arresting means.

11. In a gyroscopic instrument the combination comprising a source of direct current, a motor generator set having input terminals for connection to said source of direct current and output terminals for supplying alternating current, a gyroscope spinning motor, a relay reversing switch shiftable between two positions and connecting said output terminals to said spinning motor for rotation in one direction, when in one of said positions, and for rotation in the opposite direction, when in the other one of said positions, a relay switch shiftable between two positions and connecting said input terminals to said source of direct current when in one of said last mentioned positions, and a manually operable switch shiftable between two positions and controlling said relay switch for starting said motor generator set, when in one of said positions, and for shifting said reversing relay switch when moved to the other one of its positions, and a timing control relay operable by said reversing relay switch and operative to control said relay switch for disconnecting said input terminals from said source of current, after an interval has elapsed upon the shifting of said relay reversing switch.

References Cited by the Examiner

UNITED STATES PATENTS

| | | | |
|---|---|---|---|
| 1,240,872 | 9/17 | Perry et al. | 33—226 |
| 1,308,683 | 7/19 | Rossiter | 33—226 |
| 1,589,039 | 6/26 | Anschutz-Kaempfe | 33—226 |
| 1,702,404 | 2/29 | Holmes | 33—204.64 X |
| 1,746,420 | 2/30 | Fung. | |
| 1,924,688 | 8/33 | Anschutz-Kaempfe | 33—226 |
| 2,360,935 | 10/44 | Carlson | 33—204 X |
| 2,666,992 | 1/54 | Cloud | 33—141.5 |
| 2,835,131 | 5/58 | Vacquier et al. | 33—226 X |
| 2,872,821 | 2/59 | Derossi | 33—226 X |
| 2,930,240 | 3/60 | Rellensmann et al. | 33—226 X |

FOREIGN PATENTS

| | | |
|---|---|---|
| 987,894 | 4/41 | France. |
| 281,307 | 12/14 | Germany. |
| 842,272 | 12/52 | Germany. |
| 682,908 | 11/52 | Great Britain. |

ROBERT B. HULL, *Primary Examiner.*

ISAAC LISANN, *Examiner.*